United States Patent [19]
Stahlecker

[11] Patent Number: 5,692,367
[45] Date of Patent: Dec. 2, 1997

[54] DEVICE FOR DAMPING THE VIBRATIONS OF A PACKAGE ON SPINNING, TWISTING OR WINDING MACHINES

[75] Inventor: Fritz Stahlecker, Josef-Neidhart-Strasse 18, D-73337 Bad Überkingen, Germany

[73] Assignees: Fritz Stahlecker, Bad Überkingen; Hans Stahlecker, Süssen, both of Germany

[21] Appl. No.: 618,385

[22] Filed: Mar. 19, 1996

[30] Foreign Application Priority Data

Apr. 28, 1995 [DE] Germany ............... 195 15 601.3

[51] Int. Cl.⁶ ............................................. D01H 13/00
[52] U.S. Cl. ............................ 57/92; 188/130; 242/18 DD; 242/18 R; 242/46; 242/596.3; 267/215
[58] Field of Search ................ 242/18 R, 18 DD, 242/46, 596.3; 57/264, 313, 92; 248/629, 638; 267/215; 188/130

[56] References Cited

U.S. PATENT DOCUMENTS

| | | | |
|---|---|---|---|
| 1,390,385 | 9/1921 | Ream | 188/130 |
| 1,573,058 | 2/1926 | Hanford | 188/130 |
| 2,572,904 | 10/1951 | Bauer | 242/18 DD |
| 3,672,583 | 6/1972 | Harrison | 242/18 R |
| 4,087,055 | 5/1978 | Yasuda et al. | 242/18 DD |
| 4,102,506 | 7/1978 | Raasch et al. | 242/18 DD |
| 4,684,074 | 8/1987 | Whiteley | 242/18 DD |
| 5,163,631 | 11/1992 | Borer | 242/18 DD |

FOREIGN PATENT DOCUMENTS

| | | | |
|---|---|---|---|
| 0 249 381 B1 | 12/1987 | European Pat. Off. | |
| 2406122 | 8/1974 | Germany | 242/18 DD |
| 47-4219 | 3/1972 | Japan | 242/18 DD |
| 60-48872 | 3/1985 | Japan | 242/18 R |
| 63-26671 | 11/1988 | Japan | 242/18 DD |

*Primary Examiner*—William Stryjewski
*Attorney, Agent, or Firm*—Evenson McKeown Edwards & Lenahan PLLC

[57] ABSTRACT

A device is disclosed for damping the vibrations of a package on spinning, twisting or winding machines. Damping elements act on the swivel-mounted package holders, which damping elements are arranged on the machine frame and which are effective on the swivel direction of the package holders. The package holders are supported with tube sections on a swivel axle which is secured to the machine, and support the packages, which are pressed onto a driving roller and are rotatably supported thereon. In the swivel direction in which the packages are lifted from the drive roller, the damping is greater than in the swivel direction in which the packages are pressed onto the drive roller. The cylindrical outer contour of each individual tube section is surrounded, at a predetermined angle of contact, by a close fitting brake belt which is actuated by friction. One end of the brake belt is secured in a non-movable way on a stationary mounting, while the other end is secured to a loading spring. This loading spring tightens the brake belt in the swivel direction in which the package is lifted from the drive roller. As the rigidly supported end of the brake belt does not give, the damping effect comes into force immediately in the swivel direction which leads away from the drive roller. The counter-movement is, in contrast, hardly braked at all, as this slackens the brake belt.

11 Claims, 4 Drawing Sheets

DEVICE FOR DAMPING THE VIBRATIONS OF A PACKAGE ON SPINNING, TWISTING OR WINDING MACHINES

BACKGROUND AND SUMMARY INVENTION

The present invention relates to a device for damping the vibrations of a package on spinning, twisting or winding machines, comprising applicable damping elements which act on a swivel-mounted package holder. The damping elements are arranged on the machine frame and are effective in the swivel direction of the package holder. The package holder is supported by means of a bearing on a stationary swivel axle and the package holder supports rotatably-mounted packages pressed onto a drive roller, whereby the damping effect is greater in the swivel direction in which the packages are lifted from the drive roller than in the swivel direction in which the packages are pressed onto the drive roller.

A device of this general kind is described in the published European patent 249 381. Hydraulic damping cylinders are arranged between the machine frame and the individual package holders, which damping cylinders function differently in the two movement directions. A great damping force exists in the opening direction of the package holder, whereas in the closing direction of the package holder, the damping force is significantly reduced. This is achieved by means of a complicated valve controlled system in the plungers of the damping cylinders.

The purpose of the damping of packages is to prevent the packages from jumping upwards. Movements away from the drive roller must be intercepted, slowed down and, as they progress, reduced. However, the return movement towards the drive roller should not be braked at all. The package should always, if possible, be supported with the same bearing pressure on the drive roller. A damping effect is thus required which only comes into force when the package is lifted quickly from the drive roller, that is, a damping that becomes effective when sudden lifting movements occur, but which, however, diminishes when the package executes a counter-movement towards the drive roller.

These requirements can be fulfilled only with a certain measure of success using damping cylinders, which resemble the shock absorbers of motorized vehicles. It is almost impossible to mount the known damping cylinders free from play. At the point of connection, here formed as a link, a small amount of clearance is practically unavoidable. Only when this has been used up does the movement of the package holder have an effect on the plunger of the damping cylinder; also, in the inside of the damping cylinder, the oil flow through must be conducted in one direction or the other by means of a corresponding movement of the valve control system. This naturally requires a certain reaction time, that is, it takes several milliseconds before the valve reacts. Thus it can happen that the damping effect comes into force in the damping cylinders then, when it should, in fact, diminish again.

It is an object of the present invention to create a cost-effective package damping which reacts without any delay in every swivel direction and in the desired way.

This object has been achieved in accordance with the present invention in that the bearing has a cylindrical outer contour which is surrounded, by means of frictional connection, at a predetermined angle of contact, by a brake belt which is secured in a non-movable way on a stationary mounting at one end and at the other end on a loading spring, which loading spring tightens the brake belt in the swivel direction when the package is lifted from the drive roller.

In the case of even the smallest lifting movements of the package holders in the swivel direction away from the drive roller, the pressure of the brake belt on the cylindrical outer contour of the respective bearing is increased. Because that end of the brake belt which is supported in a non-movable way on a stationary mounting does not give, the damping effect is spontaneous. The damping effect comes into force without delay even at the slightest swivel movements. The counter-movement in contrast is hardly braked at all, as this swivel movement slackens the brake belt. The loading spring can give, so that the brake belt can execute short movements in the direction towards the drive roller. Because the damping is immediately stopped during the swivel movement towards the drive roller, the pressure on the package comes immediately into effect. The packages run very quietly because the damping works immediately on the package holder, without the use of intermediate elements provided with clearance. The damping effect can be increased if the brake belt is made wider, the angle of contact increased or if the bearing is given an outer contour with high frictional coefficients. What is important is that the area of the bearing over which the brake belt is placed cannot be altered by oxidation or dampness.

Practical experience has shown that the most advantageous angle of contact measures between 180° and 270°.

For the purpose of the invention, the force of each loaded spring may be adjustable. By increasing the tension of the loaded spring, the brake and damping effect of the brake belt can be accordingly increased. The setting of the loading springs can be carried out separately at each winding head or by means of a central regulatory system to which a plurality of winding heads are connected.

The cylindrical outer contour of the relevant bearing is preferably provided with a sliding layer. The relevant tube section of the bearing can be completely coated or, alternatively, the coating can be provided only at that place which supports the brake belt. It is particularly advantageous to surround the cylindrical outer contour of the bearing with two shells which are tightly coupled thereto. A system with screws is preferable to a simple press fit.

In a further embodiment, the shells have peripheral grooves at the lateral cut edges of the brake belt. Without these peripheral grooves, it is to be feared that the cut edges of, for example, a brake belt made of steel, would cut into the plastic surface of the shells. The outer contour of the bearing over which the brake belt runs must not be scratched.

Other objects, advantages and novel features of the present invention will become apparent from the following detailed description of the invention when considered in conjunction with the accompanying drawings.

DETAILED DESCRIPTION OF THE DRAWINGS

Figure 1:
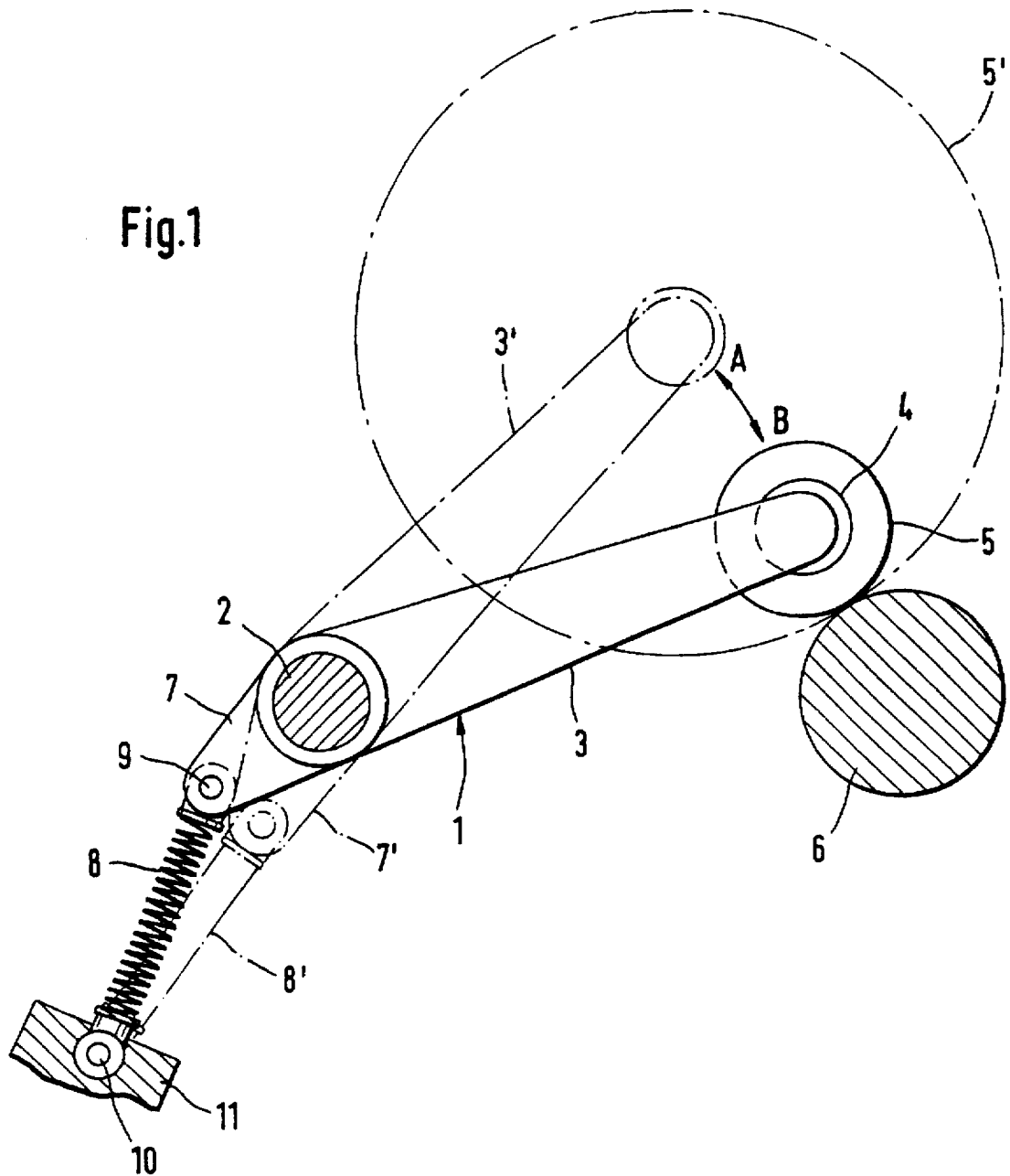
FIG. 1 is a schematic representation of a partly sectioned side view of a package holder, whose package is pressed against the relevant drive roller due to the force of a pressure spring, constructed according to a preferred embodiment of the present invention.

The package holder 1 shown only schematically in FIG. 1 is supported on a swivel axle 2 which is mounted in a non-movable way on the machine frame. In the case of a spinning, twisting or winding machine, there are a plurality of such package holders 1 arranged in a row, one beside the other.

Each package holder 1 has two lateral holding arms 3, which each support a so-called winding plate 4 in a known way. The tube for winding is mounted between the two winding plates 4 with the aid of a spring (not shown) and in such a way that it is rotatably supported. When in operation, each package 5 is supported on a rotating drive roller 6. These type of drive rollers 6 extend usually in longitudinal direction of the machine and serve to drive a plurality of packages. The other devices which are arranged at the winding position, such as the traversing thread guide, are not shown, as they have nothing to do with the present invention.

On the side of the swivel axle 2 facing away from the drive roller 6, the package holder 1 is provided with a short pressure arm 7, on which a pressure spring 8 acts. The pressure spring 8, in the form of a dead center spring, which will be described below, is applied to a link point 9 of the pressure arm 7 and is supported on the other end by a hinge point 10 on the machine frame 11. At the beginning of a winding process, after an empty tube has been placed in the package holder 1, the pressure spring 8 (shown by a continuous line) is set in such a way that, through lever action, pressure is generated on the package 5 in the direction towards the drive roller 6. As the package 5 fills, the holding arms 3 gradually swivel away from the drive roller 6 according to arrow direction A, whereby the package 5 is, as before, still supported on the drive roller 6. With increasing swivel movements in direction A, the line of application of the pressure spring 8 is altered to the effect that, after a certain time, the pressure spring 8 is aligned with the swivel axle 2 and thus does not exercise any pressure on the package 5. At this point, the package 5 is supported on the drive roller 6 by its own weight only. When the package 5 is further filled (denoted by a dot-dash line 5'), the holding arms 3 attain a position 3', in which the line of application of the pressure spring 8—see Position 8'—has such an effect that the pressure spring 8 now brings load alleviation instead of the pressure which has existed up to this point. By using such a dead center spring, the pressure of the package 5 on the drive roller 6 remains approximately constant.

When in operation, the package 5 tends to run unsteadily, to vibrate, or even to raise itself for a short time from the drive roller 6. These kinds of vibrations of the package 5 must be damped. The damping elements, located in the area of the swivel axle 2, and provided for this purpose are, however, not shown in FIG. 1.

It is important that the damping has an effect only in swivel direction A, while in swivel direction B, that is, on the drive roller 6, there should be no damping effect at all. The different damping actions should furthermore come into effect without delay. Damping according to the present invention incorporates these two requirements, which will be described with the aid of FIGS. 2 and 3.

The damping elements according to the present invention are located in the area of the swivel axle 2, which extends in longitudinal direction of the machine. The swivel axle 2 can consist of a tube or a solid material. The swivel axle 2 is secured in a non-movable way to the machine; therefore, it cannot rotate.

Figure 2:
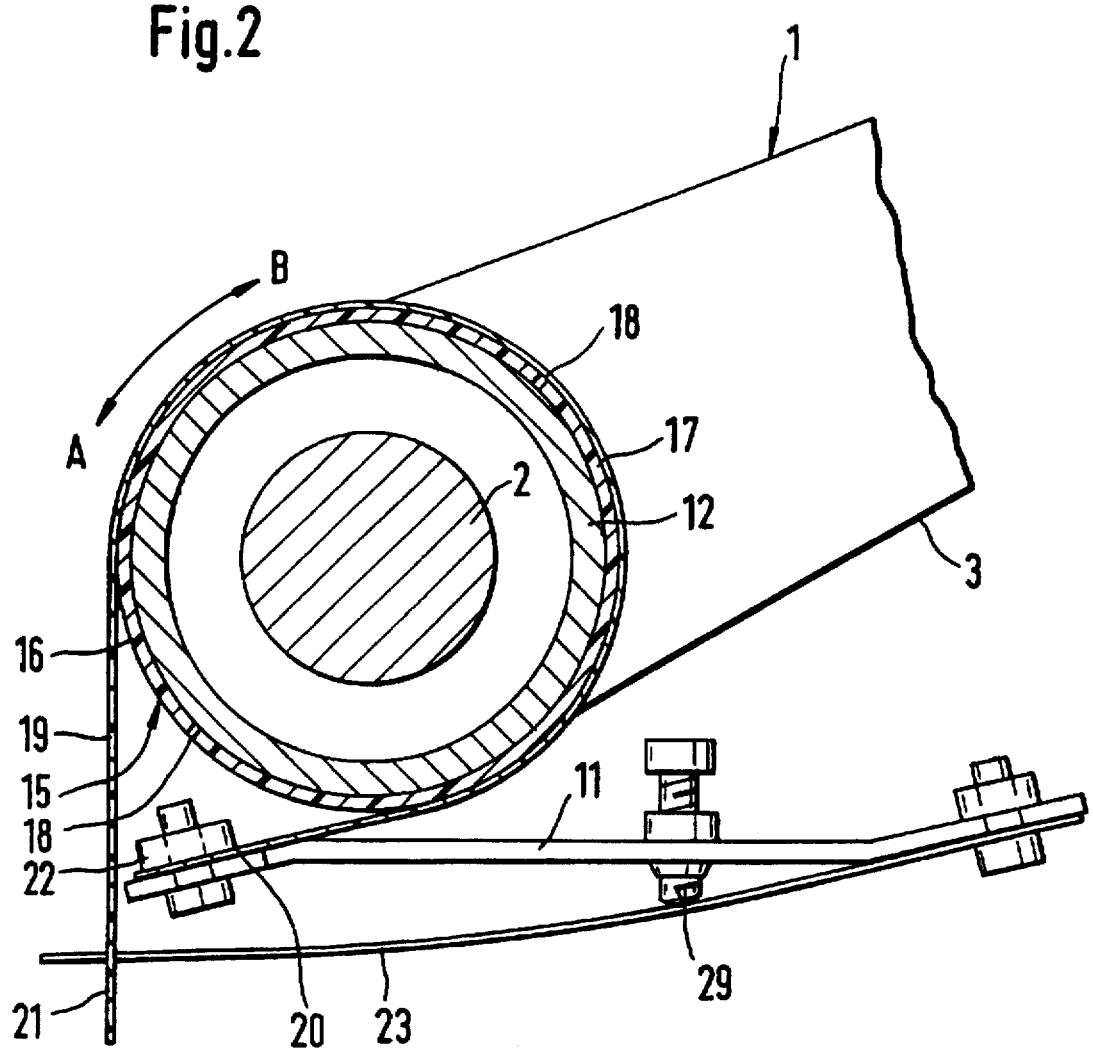
FIG. 2 is an enlarged presentation of a partial view of FIG. 1 in the area of the swivel axle of the package holder, to which damping elements are arranged.
Figure 3:
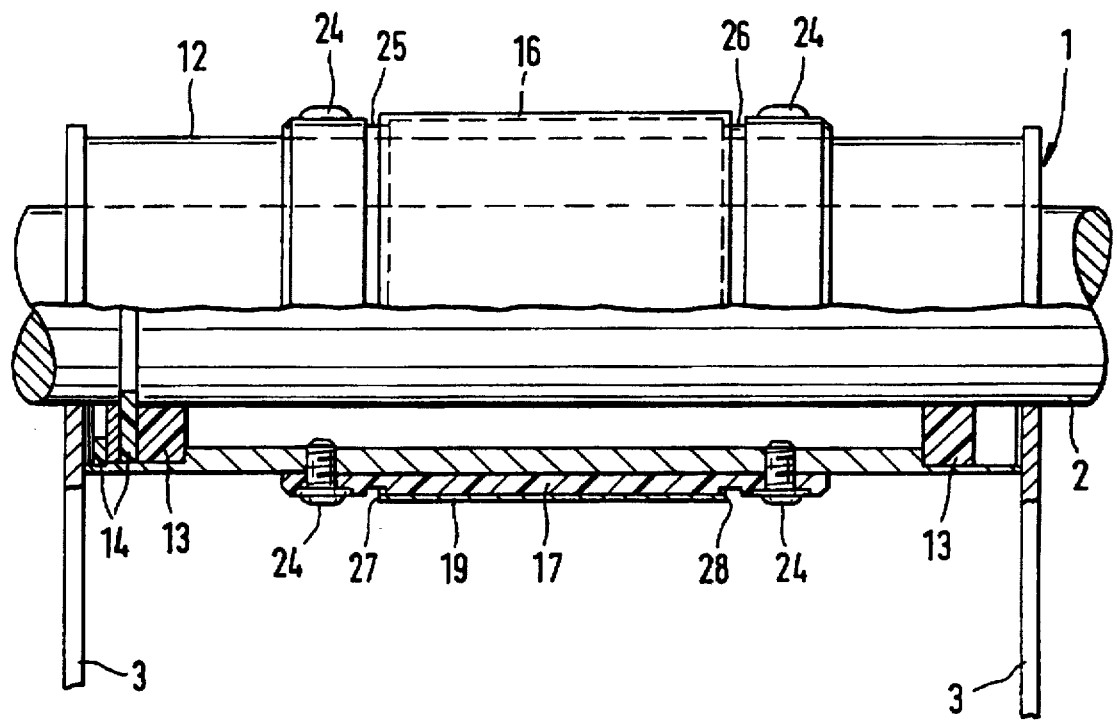
FIG. 3 is a part sectional view from above of FIG. 2.

The truncated package holder 1 with its two holding arms 3 can be seen in FIGS. 2 and 3. The pressure spring 8 and its additional devices, described in connection with FIG. 1, are not shown for representational reasons.

One tube section per winding head is slid onto the swivel axle 2, which will be denoted below as a bearing 12. The tube section is rotatable; this is achieved best by a sliding bearing. The holding arms 3 already mentioned are applied to the bearing 12, by for example, welding. How these holding arms 3 are constructed, and how they can be laterally swivelled for the purpose of removing or putting in a tube is not of relevance here.

From FIG. 3 it can be seen that each bearing 12 is supported on the swivel axle 2 by two plastic bearings 13. A lateral safety device 14 is provided to prevent axial displacement.

The bearing 12 is provided with a sliding layer 15 which covers a sufficient width thereof. This is achieved in the present case by means of two shells 16 and 17, which together encase the bearing 12. Two parting lines 18 arise as a result of the two shells 16 and 17, which lines are located diametrically opposite each other. The shells 16 and 17 are located approximately in the middle between the holding arms 3.

The shells 16 and 17, preferably made of plastic, provide a cylindrical outer contour with the desired sliding properties. It is important that the frictional coefficients do not change with the passing of time.

The shells 16 and 17 are, for their part, encased by a brake belt 19 over an angle of contact of nearly 270°. The brake belt 19 should be quite wide and extend over a large part of the width of the shells 16 and 17. The brake belt 19 can be a spring steel band; an alternative could be a textile belt, a plastic belt or a plastic belt with steel insets. Sections of a normal driving belt can also be used. The only requirement is that the brake belt 19 is flexible and surrounds the cylindrical outer contour of the bearing 12 properly, and that the frictional coefficients remain constant, whereby very slight variations do not matter.

The brake belt 19 is fixed in a non-movable way at one end 20 on a stationary mounting 22 of the machine frame 11, which end 20 is set facing in swivel direction B. The mounting 22 should not give, it should be sufficiently resistant. The end 20 of the brake belt 19 forms thus a fixed point.

The other end 21 of the brake belt 19 is connected to a loading spring 23, whose free end is placed through a transverse opening of the brake belt 19. It is, of course also possible to use other springs, for example helical springs.

The loading spring 23, shown in FIG. 2 as a leaf spring, is supported on the machine frame on its end that faces away from the brake belt 19. The leaf spring 23 ensures that the brake belt 19 is sufficiently taut in swivel direction A, that is, in the direction away from the drive roller 6; what is involved then here is namely a brake spring under spring tension.

When the package holder 1 makes a slight lifting movement in swivel direction A, the pressure of the brake belt 19 on the shells 16 and 17, or the bearing 12, is increased. Because the end 20 of the brake belt 19 does not give, the non-stretching brake belt 19 is tightened more tightly around the cylindrical outer contour of the bearing 12. The damping effect works practically without time delay, even with the slightest movements.

The counter-movement in swivel direction B is, in contrast, scarcely braked, as, with this movement, the brake belt becomes slack. The loading spring 23 can give, and the end of the brake belt 19 can follow the holding arms 3 in arrow direction B without delay.

If, for example, the package 5 contains a small convexity, the package holder 1 is forced to make a slight lifting movement as soon as the convexity passes over the drive roller 6, owing to the slightly enlarged diameter. This is braked by the brake belt 19. Because the packages 5 run very quickly, slight convexities would have the effect that the package 5, together with the package holder 1, would jump upwards, whereby the package 5 can, in an extreme case, even lift off from the drive roller 6. Damping impedes this jumping. In contrast, the convexity is compressed somewhat more so that the resulting lifting movement is as slight as possible. Directly after the convexity, that is at a point where the package 5 has a somewhat smaller diameter, the package holder 1 can execute a slight downwards movement without delay. If this was not the case, the surface of the package 5 would lose contact with the drive roller 6 for a fraction of second.

It is important that the shells 16 and 17 sit tightly coupled on the bearing 12. For this purpose, screws 24, as shown in FIG. 3, are provided.

In the area of the lateral cut edges 27 and 28 of the brake belt 19, there is respectively a peripheral groove 25,26 of a shallow depth, whereby a few tenths of a millimeter are sufficient. The purpose of these peripheral grooves 25,26 is to prevent the cut edges 27 and 28 of the brake belt 19 from damaging the sliding layer 15 or the shells 16,17. Without these peripheral grooves 25 and 26, it is to be feared that the cut edges 27 and 28 of the very thin brake belt 19 would cut into the plastic surface, scratching it. Fibre fly would then be able to cling onto the resulting fine roughness in the plastic.

As can be seen from FIG. 2, the loading spring 23, in the form of a leaf spring, can be adjusted to different heights. To this end, an adjusting screw 29, located on the machine frame 11, is applied to every winding head. Alternatively, all loading springs 23 can be jointly adjustable, at least in groups, for example by means of an adjustable cam disk (not shown).

Figure 4:
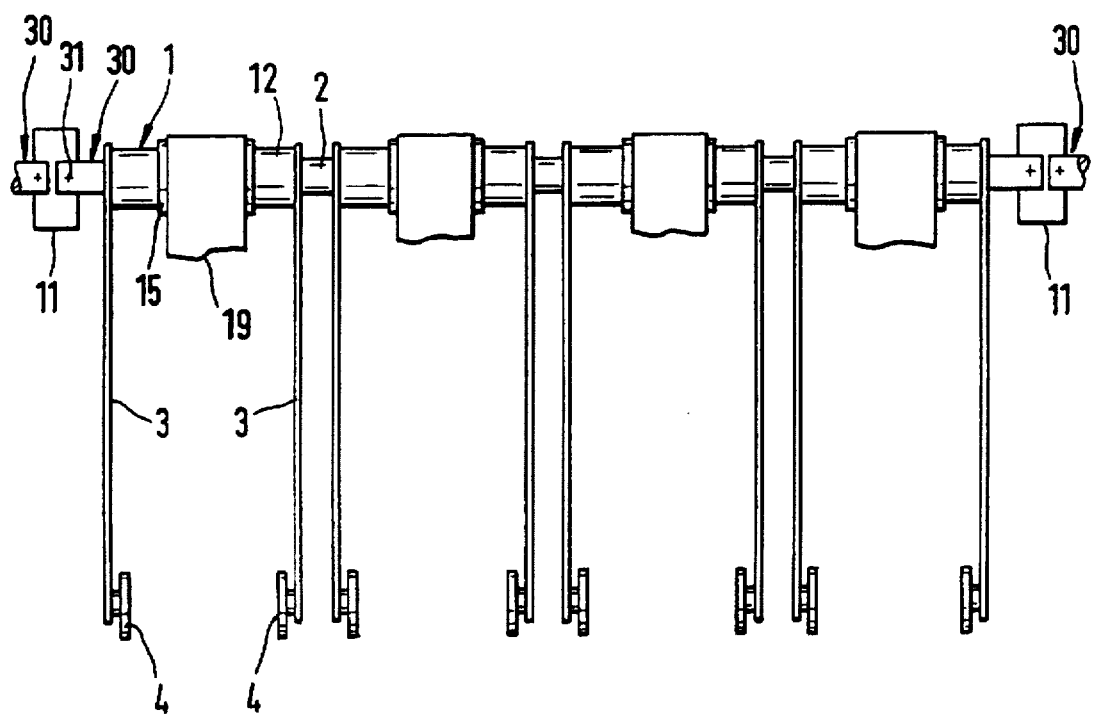
FIG. 4 is a reduced view similar to FIG. 3, whereby a plurality of package holders are arranged on a swivel axis formed as a sectional part.

According to FIG. 4, the swivel axle 2 can be made of single sections 30 joined together. A section 30 can, for example, extend over four to six winding stations. The ends of the single sections 30 of the swivel axle 2 are connected to the machine frame 11 by screws 31. It is sufficient to unscrew two safety shells in order to remove a section 30 of the swivel axle 2 from the machine. Thus sets of a plurality of package holders 1 can be pre-assembled.

The advantage of such sections 30 lies on the one hand in their cost-effective production, as their manufacture and machine assembly take less time, while on the other hand they guarantee that the swivel axle 2 can be set absolutely parallel to the drive roller 6. This has an advantageous effect on the quality of the packages 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for damping vibrations of a package on textile machinery that produces cross-wound bobbins and has a package holder for holding a package that is pivotably supported on a swivel axle by a bearing, comprising:

a brake belt in frictional contact with an outer contour section of said bearing, and a loading spring, wherein said brake belt is secured at one end to a stationary element and at an opposite end to said loading spring.

2. A device according to claim 1, wherein the package is held by the holder to be rotatably driven by a contact drive roller, and wherein said brake belt and loading spring are configured to apply a damping effect against movements of said package in a direction away from the drive roller.

3. A device according to claim 1, wherein the angle of contact of the belt with the outer contour section of said bearing measures between 180° and 270°.

4. A device according to claim 3, wherein the force of the loading spring is adjustable.

5. A device according to claim 3, wherein the outer contour of the bearing is cylindrical and is provided with a sliding layer.

6. A device according to claim 5, wherein the sliding layer is formed by shells arranged tightly coupled onto the bearing.

7. A device according to claim 6, wherein the shells, are provided with peripheral grooves on lateral cut edges of the belt brake.

8. A device according to claim 1, wherein the force of the loading spring is adjustable.

9. A device according to claim 1, wherein the outer contour of the bearing is cylindrical and is provided with a sliding layer.

10. A device according to claim 9, wherein the sliding layer is formed by shells arranged tightly coupled onto the bearing.

11. A device according to claim 10, wherein the shells are provided with peripheral grooves adjacent lateral cut edges of the belt brake.

* * * * *